United States Patent [19]

Tozawa

[11] Patent Number: 4,654,720
[45] Date of Patent: Mar. 31, 1987

[54] COLOR IMAGE DISPLAY SYSTEM
[75] Inventor: Yoshio Tozawa, Kawasaki, Japan
[73] Assignee: International Business Machines Corporation, Armonk, N.Y.
[21] Appl. No.: 727,500
[22] Filed: Apr. 26, 1985
[30] Foreign Application Priority Data Apr. 27, 1985 [JP] Japan .................. 59-84259

[51] Int. Cl.⁴ .............................................. H04N 1/40
[52] U.S. Cl. ..................... 358/283; 358/75; 358/78; 358/80; 358/284
[58] Field of Search ................ 358/75, 77, 78, 80, 358/283, 284

[56] References Cited
U.S. PATENT DOCUMENTS 4,369,461  1/1983  Tamura ................. 358/75
4,430,668  2/1984  Miles, Jr. ............... 358/80
4,516,155  5/1985  Hennig et al. .......... 358/78

Primary Examiner—Ronald C. Capossela
Attorney, Agent, or Firm—Thomas P. Dowd

[57] ABSTRACT

A color quantization system for color image displays is disclosed which uses a three-dimensional histogram of an original color image to determine the particular colors of the image to be simultaneously displayed. The number of pels within each sub-space defined on a whole color space of the three-dimensional histogram is calculated, and the subspace having the largest number of pels is selected for display from among the sub-spaces, other than the sub-spaces represented by the colors which have been already selected for simultaneous display, if it is determined that the relationship $$M \geq \frac{N - A}{n1 - n2}$$

is satisfied, wherein M is said largest number of pels, N is the number of all the pels of the original color image to be displayed, A is the number of pels in the sub-spaces represented by the display colors which have already been determined, n1 is the number of all the colors to be simultaneously displayed, and n2 is the number of the colors which have been already determined for display. When this relationship is not satisfied, the size of the sub-space is incremented until a sufficient number of pels are included to select a color, and the selection process is continued until all of the pels have been considered, i.e., N-A=0.

12 Claims, 7 Drawing Figures

COLOR IMAGE DISPLAY SYSTEM

BACKGROUND OF THE INVENTION

1. Field of the Invention

This invention relates to a color image display system of the color look-up table type, and more particularly to such a system which displays an image originally having many more color components than the number of entries of the color look-up table, or colors that can be displayed simultaneously, without substantial deterioration of image quality.

2. Description of the Prior Art

Figure 1:
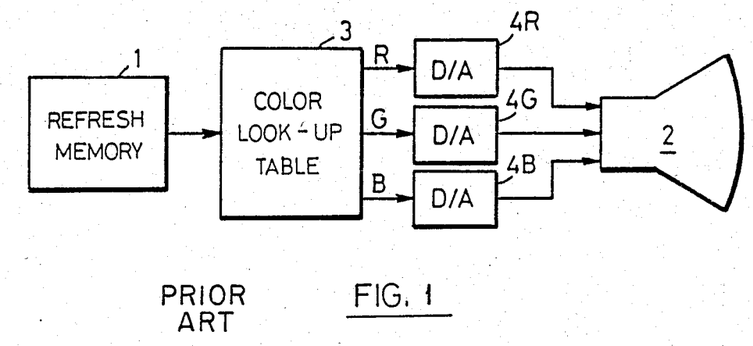
FIG. 1 is a block diagram showing a prior art system to which the present invention is directed.

Recently, color image display systems for processing color images have begun to employ color look-up tables. FIG. 1 shows an example of such a prior art color image display system, wherein image data for one frame is digitally stored in a refresh memory 1 with a bit map system, said memory 1 being accessed by the vertical and the horizontal synchronization systems of a CRT (cathode ray tube) 2 to sequentially address a color look-up table 3. The look-up table 3 feeds digital signals representing the desired primary colors of red, green and blue to D/A (digital-to-analog) converters 4R, 4G, and 4B in a later stage according to the addressing. Then, based on the outputs of the D/A converters the CRT 2 is driven.

In such a color image display system, the number of colors that may be displayed on the screen of CRT 2 is determined by the number of stages of the D/A converters 4R, 4G and 4B. For example, if each of the converters 4R, 4G and 4B has eight stages, 16,777,216 (=256*3) colors may be displayed. On the other hand, the number of colors that can be simultaneously displayed on the screen of CRT 2 is determined by the number of entries of the color look-up table 3, or the number of bits of pixel data that are stored in the refresh memory 1. For example, if the pixel data are of eight bits, only 256 (=2*8) colors can be displayed simultaneously. Usually, while the number of colors that may be displayed can be designed to be large by increasing the number of stages of each D/A converter, still the number of colors that can be displayed simultaneously may be small due to the reduced number of bits of the pixel data.

Of course, it may be possible to increase the number of bits in the pixel data, and to employ, for the color look-up table 3, one which has a very large number of entries. This arrangement would allow an original image to be stored in the refresh memory 1 without substantial deterioration in its quality, and permit it to be faithfully displayed on the CRT 2. For example, in the case where a digitizer is used that generates eight bits for each of the components, red, green and blue of a single pixel, no deterioration in the image quality would occur if the pixel data is stored in the refresh buffer 1 with 24 bits, and is subsequently decoded by the color look-up table 3 that has entries of 16,777,216 (=2*24).

However, such an arrangement would be of little practicality in view of the processing speed and complexity of its construction. Thus, it is conventionally arranged to improve performance without deterioration of image quality by suitably selecting the simultaneously displayed colors, and then suitably mapping colors composing an original image or original colors to said selected simultaneously displayed colors. Such selection of the simultaneously displayed colors and the mapping are called color quantization.

Figure 2:
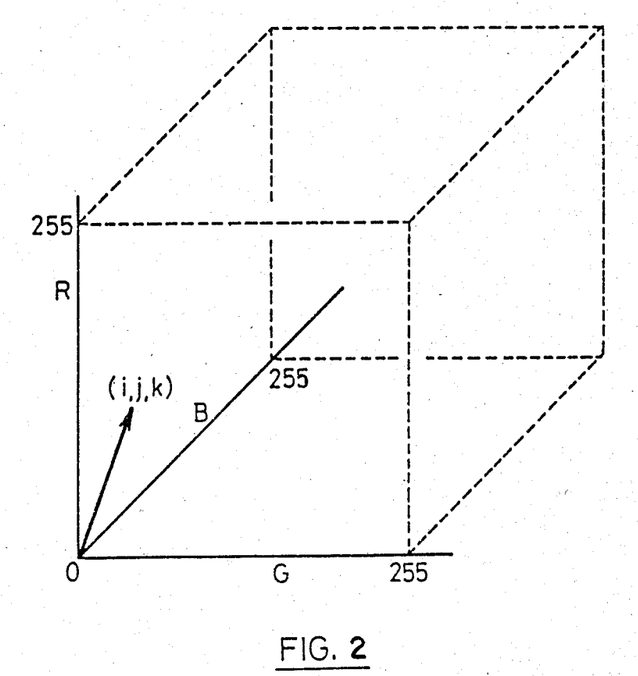
FIG. 2 is an illustrative diagram for use in explaining a three-dimensional histogram.

The popularity algorithm and the median cut algorithm are known techniques for this quantization. These algorithms first determine the colors to be simultaneously displayed, and map the original colors to the simultaneously displayed colors. The popularity algorithm refers to the popularity of particular color elements used to determine the simultaneously displayed colors. FIG. 2 will help to illustrate the technique used to recognize the popularity. FIG. 2 shows a color space that is formed by color data in which each pixel or pel of an image has eight bits assigned for each of its red, green and blue color content. Each color data is represented by an element (i,j,k) in the color space (where i, j and k have values ranging from 0 to 255). Each of, for example, 1,048,576 (=1024×1024) pixels in a frame image has its color data distributed to the elements (i,j,k) in the color space by scanning the image with a digitizer. The number of pixels divided to each element is called popularity of elements. A correlation table between each element and its popularity is called a three-dimensional histogram. The popularity algorithm determines the colors to be simultaneously displayed according to the size of popularity. For example, in the case where the number of the simultaneously displayed colors is 256, the 256 color elements having the largest popularity are selected as the simultaneously displayed colors.

The median cut algorithm utilizes each color in a color map to represent an equal number of pixels in an original image, wherein the color space is sequentially divided into two so that each of two regions contains equal numbers of pixels. Finally, it divides the color space into the same number of regions as the simultaneously displayed colors, for example, 256 regions, and then determines the colors representing these divided regions respectively, which become the simultaneously displayed colors.

Reference may be had to "SIGGRAPH'82 Proceedings Vol. 16, No. 3, July, 1982, p. 297–307 [ACM]" for more details of the popularity algorithm and the median cut algorithm.

Although the popularity algorithm and the median cut algorithm were proposed for color quantization as above, these algorithms have shortcomings in that they often cause errors when the simultaneously displayed colors are selected, and they have complicated procedures to map the original colors to the simultaneously displayed colors.

SUMMARY OF THE INVENTION

This invention is directed to overcoming the shortcomings of the above situation. It is accordingly an object of the present invention to provide a color image display system of the color look-up table type, that can reduce errors in selecting the simultaneously displayed colors, make the deterioration of the image quality of an image to be finally displayed as small as possible, and easily perform the process.

A color quantization system for color image displays according to the invention comprises:
  means for calculating the number of pels within each sub-space defined on a whole color space of a three-dimensional histogram of an original color image to be displayed;
  means for selecting the sub-space which has the largest number of pels from sub-spaces other than the sub-spaces represented by the colors which have been already determined for simultaneous display;

means for determining whether the requirement, $$M \geq \frac{N - A}{n1 - n2}$$

is satisfied or not, wherein M is said largest number of pels, N is the number of all the pels of the original color image to be displayed, A is the number of pels in the sub-spaces represented by the display colors which have already been determined, n1 is the number of all the colors to be simultaneously displayed, and n2 is the number of the colors which have been already determined for display;

means for selecting the color representing the sub-space which has the largest number of pels, as one of the displayed colors, when said requirement is satisfied; and means for incrementing the size of the sub-space, when said requirement is not satisfied.

DETAILED DESCRIPTION OF THE PREFERRED EMBODIMENT

One embodiment of the invention will be described by referring to the attached drawings. Although the embodiment is illustrated as one implemented in hardware, it is also possible to employ a software implementation.

Figure 3:
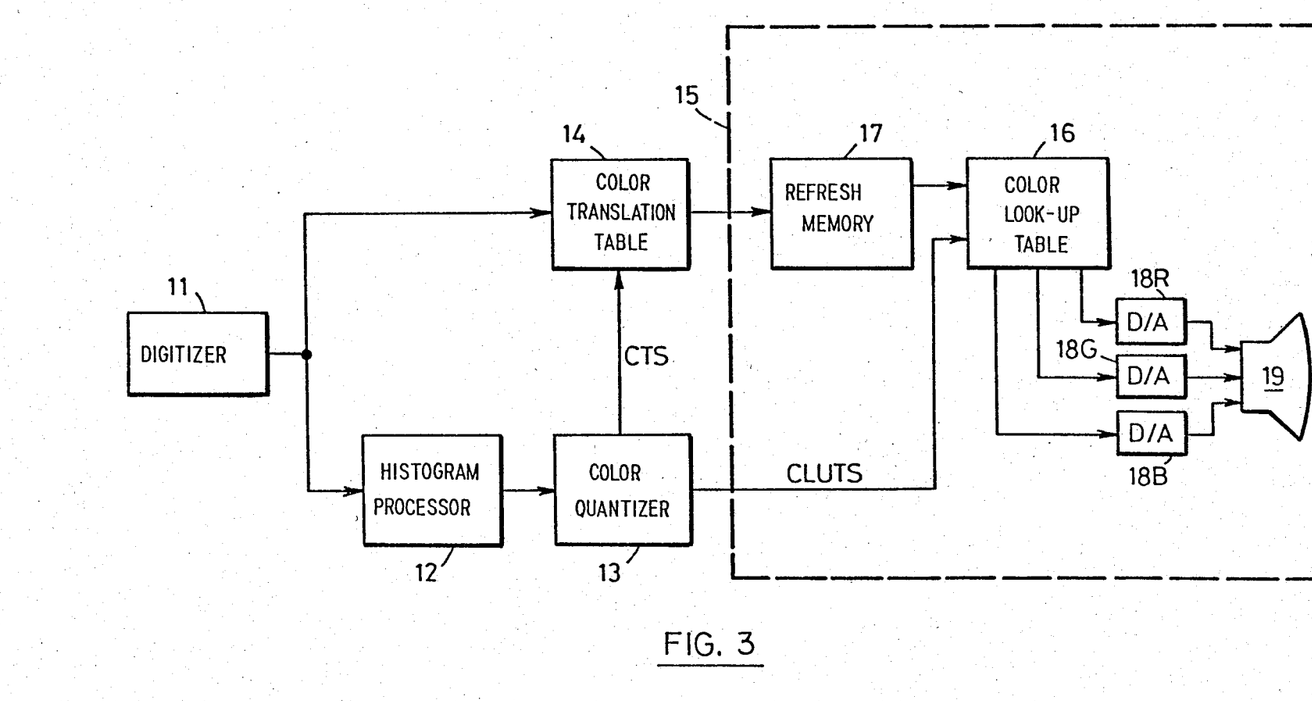
FIG. 3 is a block diagram schematically illustrating a preferred embodiment of the present invention.

FIG. 3 shows a preferred embodiment of the present invention wherein a digitizer 11 generates color image data by scanning an original image. The color image data is a stream of pixel data, which is formed with, for example, 24 bits/pixel. That is, each pixel or pel will have eight-bits of information for each color, red, green and blue. For example, the case will be considered where the digitizer 11 creates 1024×1024 pixel data through the scanning of one frame. Then, the total number N of pixels or pels in one frame is 1,048,576.

The color image data created by the digitizer 11 is supplied to a three-dimensional histogram processor 12. The processor 12 calculates a three-dimensional histogram by distributing each pixel to each element (i,j,k) (see FIG. 2) based on the color image data (pixel data) being supplied. The data from the three-dimensional processor is supplied to a color quantizer 13. The details of the color quantizer 13 will be described later when referring to FIGS. 4 and 5. The quantizer 13 performs color quantization as indicated by its designation, and more particularly supplies color translation setting data (CTS) to a color translation table 14, and color look-up table setting data (CLUTS) to a color look-up table 16 of a display device 15. The details of the CTS and CLUTS data will also be dealt with later.

The color image data from the digitizer 11 is also fed directly to the color translation table 14, where 16,777,216 varieties of color data are mapped to predetermined color numbers, for example, 0–256, and each of the color image data sets is translated to one of the color numbers. This resulting color number data is stored in a refresh memory or frame buffer 17 of the display device 15 with a bit map system.

The display device 15 has D/A converters 18R, 18G and 18B, and a CRT 19 in addition to the above-mentioned color look-up table 16 and the refresh memory or buffer 17. Of course, the color number data stored in the refresh buffer 17 is read according to the vertical and the horizontal synchronization of the CRT 19. The color number data from the refresh buffer 17 accesses the color look-up table 16, which feeds out digital color signals of red, green and blue corresponding to the color number data to a later stage, wherein the digital signals are converted into analog color signals by the D/A converters 18R, 18G and 18B to drive the CRT 19 for their display. The color numbers are correlated with the digital color signals of red, green and blue, in other words, the simultaneously displayed colors by the color look-up table setting data CLUTS and the color translation setting data CTS from the color quantizer 13. This operation will also be dealt with in detail later.

Firstly, referring to FIGS. 4–7, the color quantizer in FIG. 3 and its operation will be described in more detail.

Figure 4:
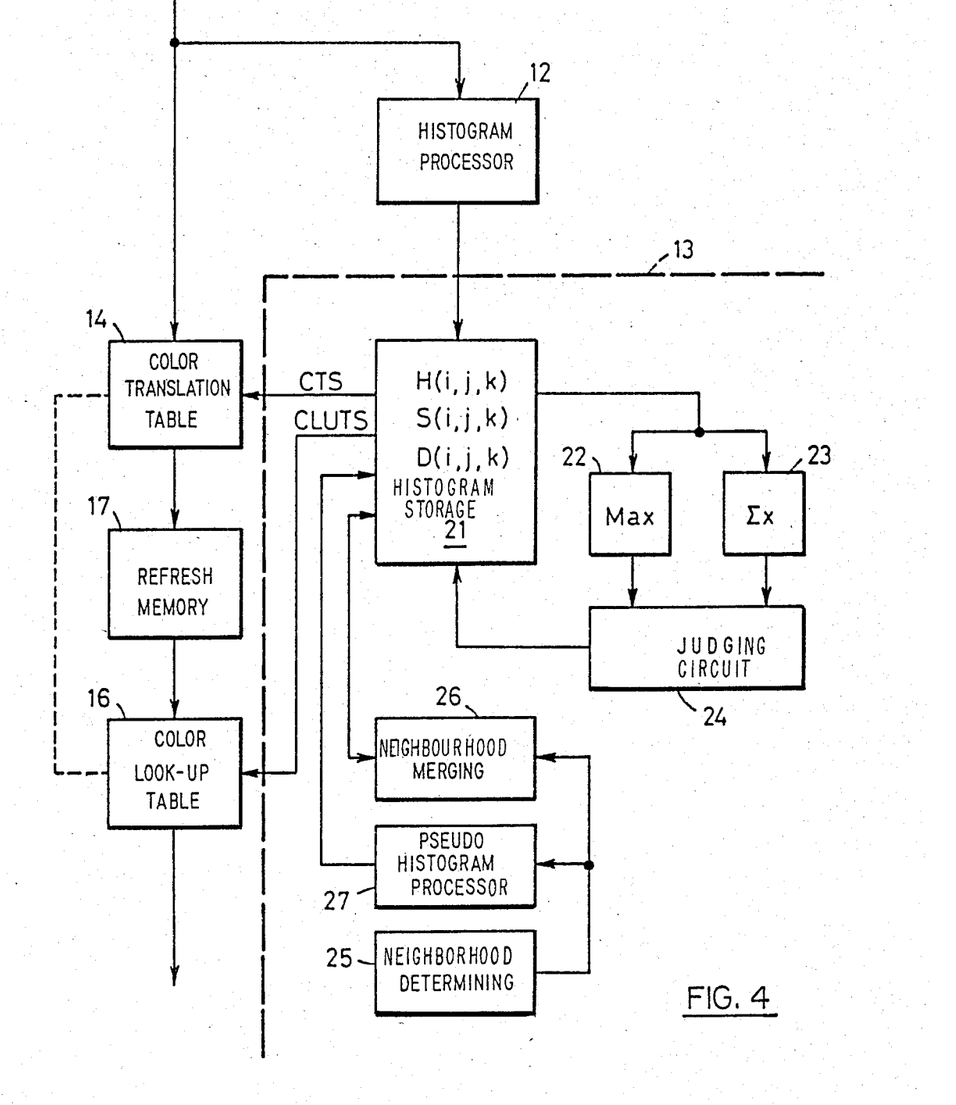
FIG. 4 is a block diagram illustrating details of the color quantizer 13 in FIG. 3.

As shown in FIG. 4, the color quantizer 13 comprises a pseudo-three-dimensional histogram storage device 21, a maximum number pixel selecting circuit 22, a totalizer circuit 23, a judging circuit 24, a neighborhood determining circuit 25, a neighborhood merging circuit 26, and a pseudo-three-dimensional histogram processing circuit 27.

The pseudo-three-dimensional histogram storage device 21 initially stores the histograms supplied from the three-dimensional histogram processor 12. That is, it stores the popularity H (i,j,k) for each element (i,j,k) in the color space shown in FIG. 2. In procedures for determining the simultaneously displayed colors, it also stores simultaneously displayed popularity S (i,j,k) and a distance D (i,j,k) both generated in the pseudo histogram processor 27.

The maximum number pixel selecting circuit 22 will select the largest popularity S (i,j,k) stored in the pseudo-three-dimensional histogram storage device 21. Now, the result of this selection, M, is expressed as M=Max S (i,j,k). The totalizer circuit 23 is used to determine the total number of T of H (i,j,k) stored in the pseudo-three-dimensional histogram storage device 21. That is, T=εH (i,j,k). The judging circuit 24 judges whether or not the relationship $$M \geq \frac{T}{nr}$$

is established for the values M and T, where nr is the number of simultaneously displayed colors not yet determined. For example, nr is decremented 256, 255, ..., 1 according to the simultaneously displayed color determining means.

The neighborhood determining circuit 25 will define a neighborhood for an element (i,j,k) and acts to determine elements (i',j',k') contained in the neighborhood. More particularly, it makes the elements (i',j',k') satisfy $$(i-i')^2 + (j-j')^2 + (k-k')^2 \leq R$$

where R is a parameter to determine the range of neighborhood. As will be understood later, the neighborhood gradually increases, i.e., R increases as 0, 1, 2, ..., and, if the elements (i,j,k) are indicated by a unit cube shown by solid lines in FIG. 6A for comparison, the elements (i'j'k') contained in the smallest neighborhood (R=1) are six unit cubes shown by broken lines in FIG. 6A. The next smallest neighborhood, R=2, is shown in FIG. 6B, being 19 unit cubes, and R=3 being 27 unit cubes is shown by broken lines in FIG. 6C.

The pseudo histogram processing circuit 27 will calculate S (i,j,k) and D (i,j,k) that were briefly explained earlier. S (i,j,k) is expressed as:

$$S(i,j,k) = H(i,j,k) + \sum_{i'}\sum_{j'}\sum_{k'} H(i',j',k')$$

That is, S (i,j,k) is a total of popularity contained in the neighborhood of the element (i,j,k). D (i,j,k) is expressed as:

$$D(i,j,k) = \sum_{i'}\sum_{j'}\sum_{k'} \{(i-i')^2 + (j-j')^2 + (k-k')^2\}$$

where i', j' and k' designate an element which has H (i',j',k') of non-zero. D (i,j,k) indicates how much the element (i,j,k) is off from the center of whole elements (i',j',k') with H (i',j',k')≠0.

The neighborhood merging circuit 26 will search elements (i',j',k') having H (i',j',k') of non-zero in the neighborhood of the element (i,j,k) that has been registered in the color look-up table 16 as the simultaneously displayed color, and then set again the color translation table 14 so that the latter element is mapped to a corresponding color number. In this case, H (i',j',k') in the pseudo-three-dimensional histogram storage device 21 is set for zero.

Figure 5:
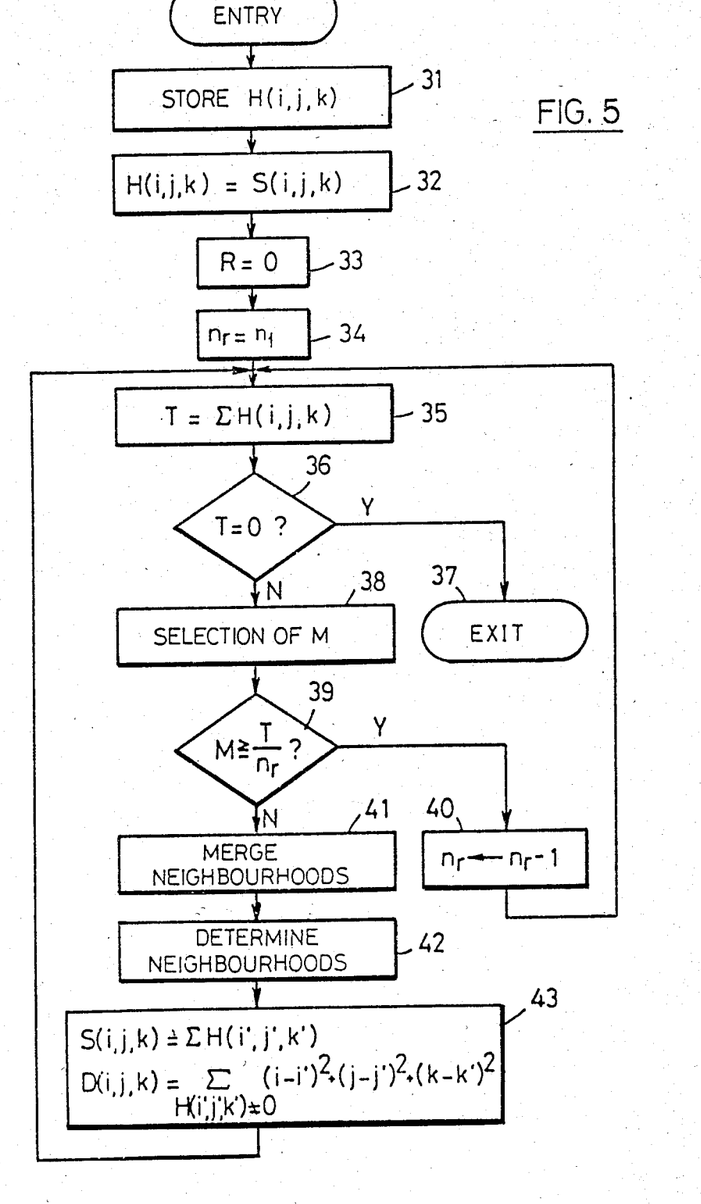
FIG. 5 is a flowchart for explaining the operation of the components of the color quantizer 13 in FIG. 4.
Figure 6:
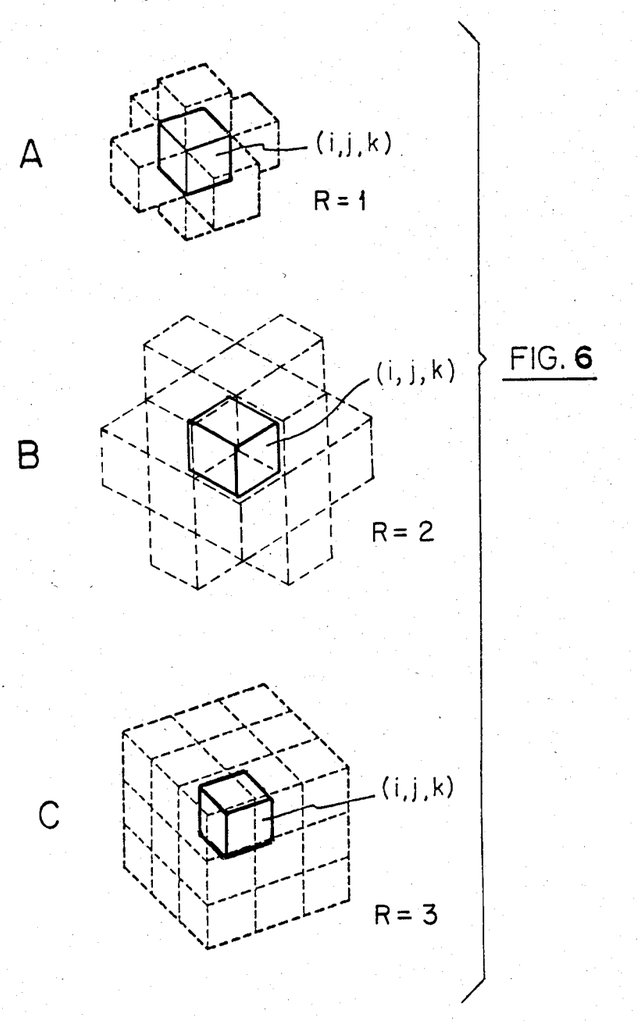
FIGS. 6 and 7 are illustrative diagrams for use in explaining the operation of quantizer 13 in FIG. 3.

Now, referring to FIG. 5, the operation of the components of the color quantizer 13 in FIG. 4 will be described.

The operation is started by storing the popularity H (i,j,k) of a particular element calculated in the three-dimensional processor 12, in the pseudo-three-dimensional storage device 21 (Step 31). Then, selection of S (i,j,k) in the three-dimensional histogram storage device 21 is initiated for said H (i,j,k) (Step 32). Further, the neighborhood in the neighborhood determining circuit 25 is initialized for R=0 (Step 33), and the number of residual simultaneously displayed colors nr is initialized for nr=n1 (for example, 256) (Step 34).

Then, N, or a running total T, for the image frame being displayed is calculated. That is, the totalizer circuit 23 executes T=εH (i,j,k) (Step 35). Since immediately after the beginning operation, H (i,j,k)=S (i,j,k) and H (i,j,k) is also fed from the three-dimensional processor 12, T=εH (i,j,k)=N, the number of all the pixels in the frame, for example, 1,048,576 (=1024²). In the next place, it is judged whether or not T=0 (Step 36). If T=0, the operation terminates because the mapping is completed for all of the original colors (Step 37). If T≠0, a further procedure for the determination of the simultaneously displayed color continues, and then the maximum number pixel selecting circuit 22 selects the largest S (i,j,k) to obtain M=Max S (i,j,k) (Step 38). In this case, if there are a plurality of largest S (i,j,k) then the one with the smallest D (i,j,k) is selected. Then, the judging circuit 24 executes the judgement of:

$$M \geq \frac{T}{nr} = \frac{N-A}{n1-n2} \qquad \text{(Step 30)}$$

It will be seen that T equals N, the total number of pels in the original image, minus A, the number of pels in the subspaces represented by the colors to be displayed that have already been determined; and nr equals n1, the total number of colors to be simultaneously displayed, minus n2, the number of such colors that have already been determined.

Figure 7:
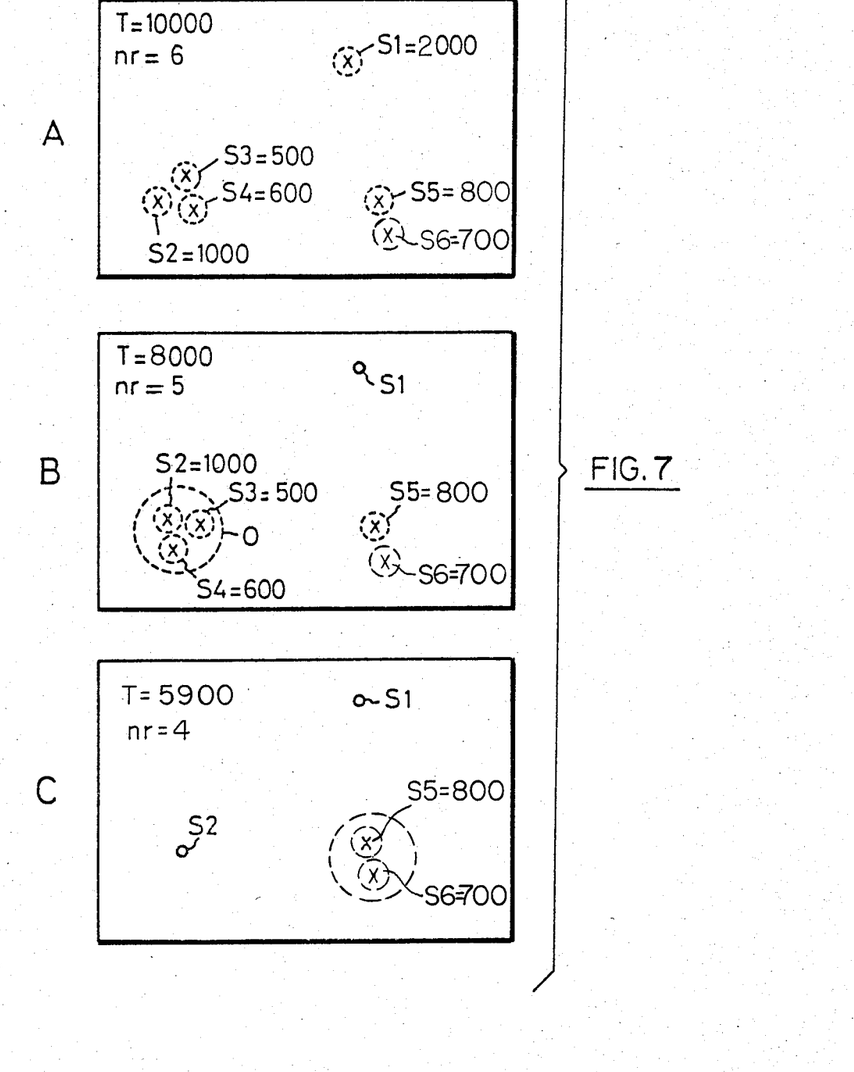

Now, the meaning of conditional expression $$M \geq \frac{T}{nr}$$

will be considered. Briefly, the conditional expression enables remaining pixels to be distributed to the remaining simultaneously displayed colors as evenly as possible. For example, such a case is considered where 250 out of 256 simultaneously displayed colors are already registered, with nr=6 (256−250) and T=10,000. FIG. 7 shows a two-dimensional color space rather than a three-dimensional one for convenience of description. Popularity values for S1 through S6 are as shown in the FIG. In the case of FIG. 7A, it is desirable to divide the remaining pixels T=10,000 by nr=6 as evenly as possible. If $$M = S_1 = \max(S_1, S_2, S_3 \ldots) \geq \frac{10,000}{6},$$

it satisfies the best selection requisite to select this S1 as the simultaneously displayed color. Actually, although S1 contains surplus pixels because $$M = S_1 = 2000 \geq \frac{10,000}{6},$$

this surplus doesn't affect the decision that S1 should be selected as the simultaneously displayed color. If $$M \geq \frac{T}{nr}$$

is established, the operation is returned to Step 35 by substituting (nr−1) as the new nr (Step 40). In such case, S (i,j,k) with the largest number of pixels is selected as the simultaneously displayed color, and registered in the color look-up table 16. At the same time, this S (i,j,k) is deleted from the pseudo-three-dimensional-histogram storage device 21, and H (i,j,k) and H (i',j',k') contained in S (i,j,k) are set for zero. On the other hand, if $$M \geq \frac{T}{nr}$$

is not established, the neighborhood merging circuit 26 will search the neighborhood of element (i,j,k) that is already registered by the color look-up table 16 as a simultaneously displayed color to obtain elements (i',j',k') satisfying H (i',j',k')≠0, and then feed such elements (i',j',k') to the color translation table 14, as the data CTS, to map them to the corresponding color number. And at the same time, H (i',j',k') in the pseudothree-dimensional histogram storage device 21 is set for zero (Step 41).

Then, the neighborhood is incremented by the neighborhood determining circuit 25 (Step 42). When the neighborhood determining circuit 25 operates the first time, the increment makes the neighborhood as shown by the broken lines in FIG. 6A. When it operates the second time, the increment makes the neighborhood as shown by the broken lines in FIG. 6B and the third time is shown in FIG. 6C. The same operation will apply to the following. When the incrementing is performed as above, the pseudo-histogram processing circuit 27 newly calculates S (i,j,k) and D (i,j,k) (Step 43). Then, the operation is returned to Step 35.

When such incrementing is performed, $$M \geq \frac{T}{nr}$$

is easily established. For example, such a state is considered which is caused after S1 is selected as the simultaneously displayed color as described referring to FIG. 7A, and which is shown in FIG. 7B. A small circle S1 indicates that it is already selected as the simultaneously displayed color, and deleted from the color space. In the case of FIG. 7B, $M = S2 = 1,000$ with $T = 10,000 - 2,000 = 8,000$, and $nr = 5$. Therefore, $$M \geq \frac{T}{nr}$$

is not established, since $1,000 < 1,600$, and S2 is not selected as the simultaneously displayed color as it is. Thus, the neighborhood is expanded by the neighborhood determining circuit 25. In FIG. 7B, it is exaggerated as indicated by a broken line circle 0. This newly adds $S3 = 500$ and $S4 = 600$ to S2 to make $S2 = 2,100$, which satisfies $$M \geq \frac{T}{nr}$$

Thus, the element (i,j,k) of S2 is registered in the color look-up table 16 as the simultaneously displayed color. Next, as shown in FIG. 7C, $M = S5 = 400$ with $T = 8,000 - 2,100 = 5,900$, and $nr = 4$. Again, $$M \geq \frac{T}{nr}$$

is not established as $800 < 1,475$. Consequently, the neighborhood is expanded adding $S5 = 700$ to make $S4 = 1,500$, which satisfies the relationship needed to register S4 in the color look-up table 16.

The operation continues until $T = 0$. Finally, all of the simultaneously displayed colors are registered in the color look-up table 16, and the elements (i,j,k) and (i',j',k') corresponding to the simultaneously displayed colors are registered in the color translation table 14.

After the setup of the color translation table 14 and the color look-up table 16 by the color quantizer 13 for a given image frame, as above described, the image data from the digitizer 11 for that frame is quantized and displayed on the CRT 19 in its best form. The process is then repeated for successive image frames. As described, the system according to this invention calculates the popularity (number of pixels) for small spaces defined on the color space, and, if the largest popularity M satisfies $$M \geq \frac{T}{nr} = \frac{N - A}{n1 - n2}$$

where T is the number of pixels not mapped for registered simultaneously displayed colors, and nr is the number of undefined simultaneously displayed colors, it registers a color element (i,j,k) representing the largest popularity M as a simultaneously displayed color. On the other hand, if $$M \geq \frac{T}{nr}$$

is not satisfied, it increments the small spaces to establish $$M \geq \frac{T}{nr},$$

that is, the scale for calculating the popularity is made coarse so that the remaining pixels T can be divided as evenly as possible into nr color elements.

Thus, it is possible to perform the color quantization with very little deterioration of the image quality. In addition, it is possible to simplify the processing because the selection and the mapping of simultaneously displayed colors are performed at the same time.

The invention may be implemented using an IBM5080 Graphic Systems Workstation and an IBM7350 Image Processing System with the so-called IBM Professional Graphics attachment to the IBM PC.

Having thus described my invention, what I claim as new and desire to secure by Letters Patent is:—

1. A color quantization system for determining the colors to be simultaneously displayed in a color image display from among the colors in an original image comprising:
   means for storing data on the number of pels within each sub-space defined on a whole color space of a three-dimensional histogram of the original color image;
   means for selecting the sub-space which has the largest number of pels M from among said sub-spaces other than sub-spaces represented by the colors to be displayed simultaneously which have already been determined;
   means for determining whether the requirement, $$M \geq \frac{N - A}{n1 - n2}$$

is satisfied or not, wherein N is the number of all the pels of said original color image to be displayed, A is the number of pels in the sub-spaces represented by the colors to be displayed which have already been determined, n1 is the number of colors to be simultaneously displayed, and n2 is the number of colors to be displayed which have already been determined;
   means for selecting the color representing the sub-space which has the largest number of pels, as one of the colors to be displayed, when said requirement is satisfied; and
   means for incrementing the size of a sub-space, when said requirement is not satisfied.

2. A system as in claim 1 further comprising means for outputting color translation setting data, when said requirement is not satisfied.

3. A system as in claim 1 further comprising means for outputting color look-up setting data, when said requirement is satisified.

4. A system as in claim 1 further comprising means for outputting data to select a sub-space as having its color to be displayed when more than one sub-space has the largest number of pels.

5. A system as in claim 1 further comprising means for calculating the number of pels within each sub-space defined on a whole color space of a three-dimensional histogram of the original color image.

6. A color quantization method for determining the colors to be simultaneously displayed in a color image display from among the colors in an original image, comprising the steps of:

calculating the number of pels within each sub-space defined on a whole color space of a three-dimensional histogram of the original color image;

selecting the sub-space which has the largest number of pels M from among said sub-spaces other than sub-spaces represented by the colors to be displayed simultaneously which have already been determined;

determining whether the requirement, $$M \geq \frac{N-A}{n_1} - n_2$$

is satisfied or not, wherein N is the number of all the pels of said original color image to be displayed, A is the number of pels in the sub-spaces represented by the colors to be displayed which have already been determined, n1 is the number of colors to be simultaneously displayed, and n2 is the number of colors to be displayed which have already been determined;

selecting the color representing the sub-space which has the largest number of pels, as one of the colors to be displayed, when said requirement is satisfied; and incrementing the size of a sub-space, when said requirement is not satisfied, until it becomes satisfied.

7. A method as in claim 6 further comprising the step of outputting color translation setting data, when said requirement is not satisfied.

8. A method as in claim 6 further comprising the step of outputting color look-up setting data, when said requirement is satisified.

9. A method as in claim 6 further comprising the step of outputting data to select a sub-space as having its color to be displayed when more than one sub-space has the largest number of pels.

10. A color image display system comprising:

means for producing a three-dimensional histogram of an original color image to be displayed;

means for calculating the number of pels within each sub-space defined on a whole color space of the three-dimensional histogram of said original color image produced by said histogram producing means;

a color look-up table comprising input means for receiving input data signals and output means for producing output data signals in response to said input data signals;

color translation table means for receiving setting data signals and providing input data signals to said input means of said color look-up table;

color quantizing means for supplying color translation setting data signals to said color translation table means and color look-up table setting data signals to said input means of said color look-up table, said quantizing means comprising:
means for storing the pel number data calculated by said calculating means; and
means for selecting the colors to be simultaneously displayed using said pel number data; and means responsive to the output signals of said output means of said color look-up table for displaying said colors selected to be simultaneously displayed.

11. A system as in claim 10 further comprising means for providing successive image frames of original color images in digital form to said histogram producing means and said color translation table means.

12. A system as in claim 10 further comprising refresh buffer means for storing input data signals from said color translation table means and providing input data signals to said input means of said color lookup table.

* * * * *